US008523725B2

(12) United States Patent
Torii et al.

(10) Patent No.: US 8,523,725 B2
(45) Date of Patent: Sep. 3, 2013

(54) LUBRICATING STRUCTURE OF SPEED CHANGE MECHANISM

(75) Inventors: Takeshi Torii, Anjo (JP); Chihiro Onishi, Anjo (JP); Takahiro Miyazawa, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 260 days.

(21) Appl. No.: 12/946,908

(22) Filed: Nov. 16, 2010

(65) Prior Publication Data

US 2011/0124461 A1    May 26, 2011

(30) Foreign Application Priority Data

Nov. 25, 2009   (JP) ................................ 2009-268149

(51) Int. Cl.
*F16H 57/04* (2010.01)

(52) U.S. Cl.
USPC ....................................................... 475/159

(58) Field of Classification Search
USPC .......................................................... 475/159
See application file for complete search history.

(56) References Cited

U.S. PATENT DOCUMENTS

| 3,978,742 | A | * | 9/1976 | Abbott ........................... 475/266 |
| 4,296,645 | A | * | 10/1981 | Jameson ......................... 475/52 |
| 4,759,234 | A | * | 7/1988 | Premiski et al. .............. 475/159 |
| 5,643,126 | A |   | 7/1997 | Hotta et al. |

FOREIGN PATENT DOCUMENTS

| JP | U-61-6065    | 1/1986 |
| JP | U-61-67456   | 5/1986 |
| JP | U-62-49052   | 3/1987 |
| JP | A-2-72243    | 3/1990 |
| JP | U-2-110747   | 9/1990 |
| JP | U-5-42812    | 6/1993 |
| JP | A-08-270766  | 10/1996 |
| JP | A-10-184857  | 7/1998 |
| JP | A-2008-157470 | 7/2008 |

OTHER PUBLICATIONS

Jan. 18, 2011 International Search Report issued in PCT/JP2010/006374 (with translation).

* cited by examiner

*Primary Examiner* — Erin D Bishop
(74) *Attorney, Agent, or Firm* — Oliff & Berridge, PLC

(57) ABSTRACT

A lubricating structure for a speed change mechanism, which includes a planetary gear that supports a pinion gear, the pinion gear revolving around a sun gear while rotating, by a carrier via a pinion shaft. The lubricating structure configured with an oil receiver integrally attached to the carrier, and having a collecting portion for collecting oil, which is scattered from an inner diameter side, on a side opposite to the pinion gear with respect to a side plate of the carrier, and a guide portion for guiding the oil collected by the collecting portion. Furthermore, the guide portion extends through the side plate of the carrier, and has an opening on an inner diameter side of a center of the pinion shaft to supply the oil to a tooth surface of the pinion gear.

7 Claims, 5 Drawing Sheets

LUBRICATING STRUCTURE OF SPEED CHANGE MECHANISM

The disclosure of Japanese Patent Application No. 2009-268149 filed on Nov. 25, 2009 including the specification, drawings and abstract is incorporated herein by reference in its entirety.

BACKGROUND OF THE INVENTION

The present invention relates to lubricating structures of speed change mechanisms for use in automatic transmissions, hybrid drive devices, and the like, and more particularly to lubricating structures of planetary gears.

DESCRIPTION OF THE RELATED ART

In general, those planetary gears are widely known in the art which have a plurality of rotating elements, namely a sun gear that is located in the center, a pinion gear that revolves about the sun gear while rotating, a carrier that supports the pinion gear, and a ring gear that is positioned so as to mesh with the pinion gear and to surround the pinion gear. In automatic transmissions, hybrid drive devices, and the like, such a planetary gear is combined with a friction engagement element such as a clutch and a brake to form a speed change mechanism for shifting power from a power source (an engine and a motor).

For such a speed change mechanism has been proposed a lubricating apparatus in which oil holes are formed in the tooth bottom of a sun gear to lubricate a planetary gear by oil that is scattered from the oil holes by centrifugal force resulting from rotation of the sun gear (see Japanese Patent Application Publication No. JP-A-2008-157470). For such a lubricating apparatus for supplying oil from the oil holes of the sun gear, it has also been proposed to provide a carrier with an oil reservoir that axially overlaps the sun gear, and to collect oil scattered from the oil holes of the sun gear to supply the collected oil to a pinion gear (see Japanese Patent Application Publication No. JP-A-H02-72243).

SUMMARY OF THE INVENTION

However, in the case of lubricating the planetary gear by the oil supplied from the oil holes provided in the tooth bottom of the sun gear as in the speed change mechanisms of Japanese Patent Application Publication No. JP-A-2008-157470 and Japanese Patent Application Publication No. JP-A-H02-72243, a sufficient amount of oil required to lubricate the planetary gear may not be able to be supplied from the oil holes if the sun gear is fixed.

Moreover, since the pinion gear revolves around the outer periphery of the sun gear, only regions around teeth that mesh with those meshing teeth of the sun gear which have the oil holes are lubricated, and lubricating capability in these regions varies from regions around teeth that mesh with those meshing teeth of the sun gear which are located between the oil holes. If the number of oil holes is increased so as to increase the lubrication capability, this increases processing cost.

It is an object of the present invention to provide a lubricating structure of a speed change mechanism which solves at least one of the above problems by integrally attaching to a carrier an oil receiver that collects oil on the side opposite to a pinion gear with respect to a side plate of the carrier, and supplies the collected oil to the tooth surface of the pinion gear.

According to the invention of a first aspect, since the oil receiver is integrally attached to the carrier, oil collected by the oil receiver can be continuously supplied to the tooth surface of the pinion gear that revolves about the sun gear. The oil receiver collects oil, which is scattered from an inner diameter side, on a side opposite to the pinion gear with respect to the side plate of the carrier. Thus, a sufficient amount of oil can be supplied to the pinion gear even if the sun gear is fixed. Moreover, since no oil hole need be formed in the tooth bottom of the sun gear, processing cost can be reduced.

According to the invention of a second aspect, the oil receiver collects oil that has passed through a hydraulic servo of a clutch located adjacent to the oil receiver. Thus, the pinion gear can be lubricated by relatively low temperature oil that has not been heated by gear meshing, whereby cooling capability can be increased.

According to the invention of a third aspect, the oil receiver is used also as a spacer for maintaining a gap between the hydraulic servo of the clutch located adjacent to the oil receiver, and the carrier. This reduces the number of parts, whereby cost reduction can be achieved.

According to the invention of a fourth aspect, a guide portion of the oil receiver is formed long along the pinion gear, and openings are formed at a plurality of positions in an intermediate region of the guide portion. Thus, oil can be uniformly supplied to the entire tooth surface of the pinion gear.

According to the invention of a fifth aspect, the pinion gear that is rotationally driven in a fixed direction is a helical gear so that oil flows on the tooth surface of the pinion gear in a fixed direction, and the opening of the guide portion of the oil receiver is provided on an upstream side of a flowing direction of the oil. Thus, the oil can be supplied to the entire tooth surface of the pinion gear along the flowing direction of the oil.

According to the invention of a sixth aspect, in a double-pinion type planetary gear, the guide portion of the oil receiver is provided at a position forward of a first pinion gear, which meshes with a ring gear, in the rotation direction of the carrier. Thus, oil scattered from the opening of the guide portion can be efficiently directed to a tooth surface of the first pinion gear by inertial force, and the oil can be supplied also to the sun gear and a tooth surface of a second pinion gear via the first pinion gear.

According to the invention of a seventh aspect, even if the sun gear is fixed, the oil receiver can collect oil from the side opposite to the pinion gear with respect to the side plate of the carrier, and supply the collected oil to the pinion gear.

DETAILED DESCRIPTION OF THE EMBODIMENTS

First Embodiment

A first embodiment of the present invention will be described below with reference to the accompanying drawings. Note that in the following description, the longitudinal, lateral, and vertical directions are based on the directions in the case where an automatic transmission is mounted on a vehicle, the expression "forward in the rotation direction" means forward in the direction of rotation, and the expression "rearward in the rotation direction" means rearward in the direction of rotation, namely the upstream side of rotation. As used herein, the terms "clutch" and "brake" are intended to include friction plates (outer friction plates and inner friction plates) and a hydraulic servo for connecting and disconnecting the friction plates to and from each other.

Figure 1A:
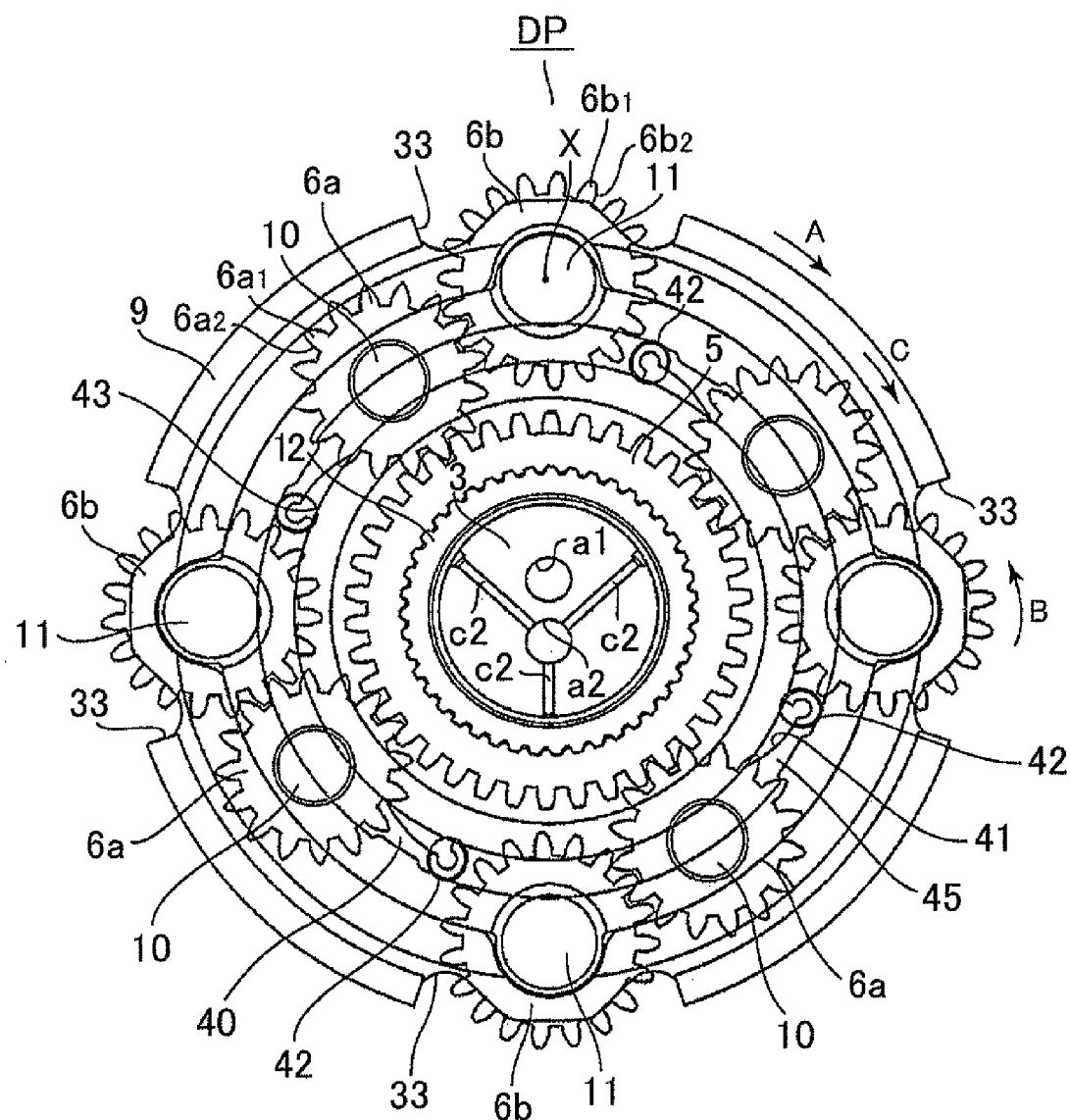
FIG. 1A is a front view of a planetary gear of a speed change mechanism according to a first embodiment of the present invention.
Figure 1B:
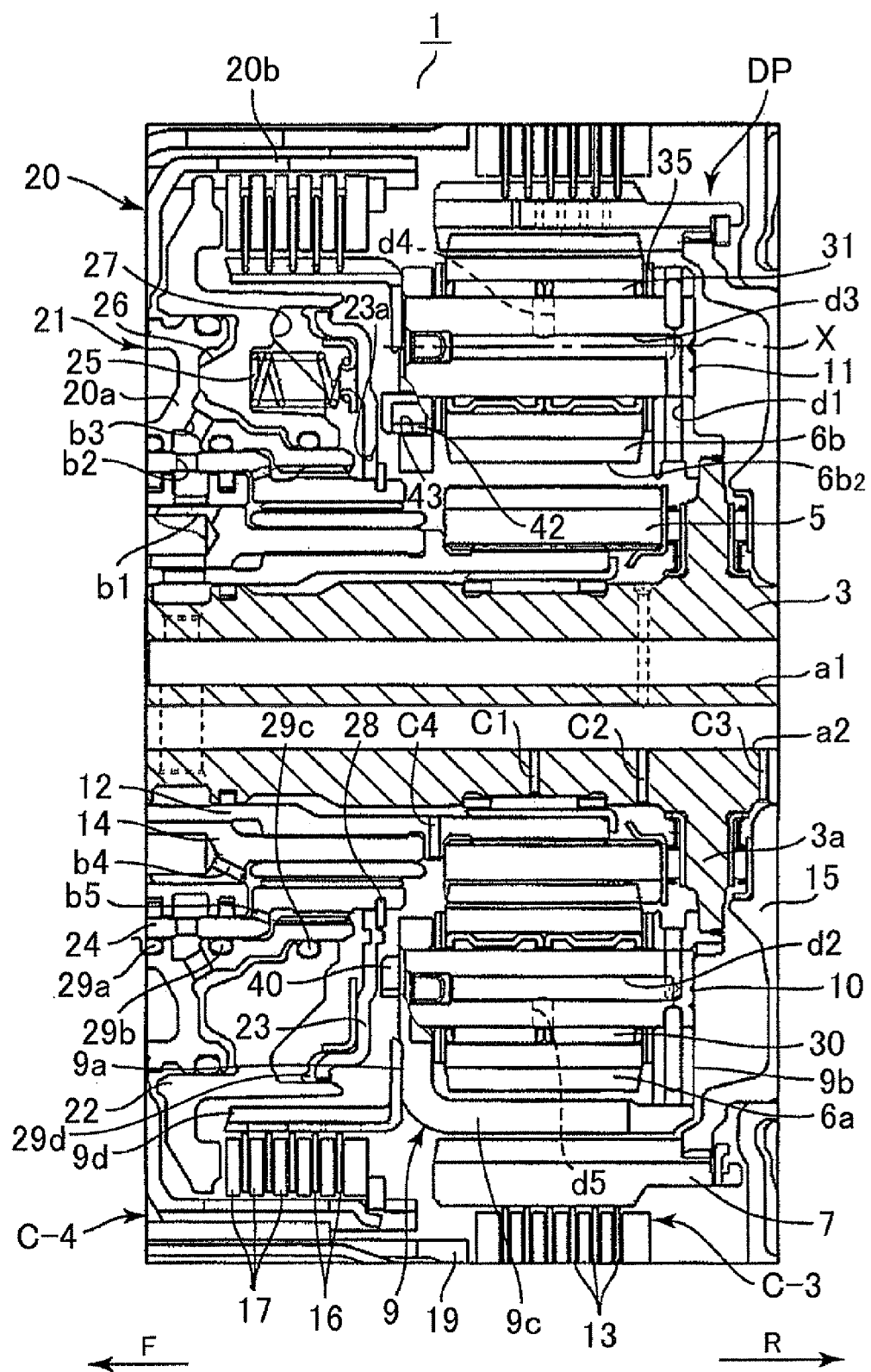
FIG. 1B is a side view of the speed change mechanism according to the first embodiment of the present invention.
Figure 2C:
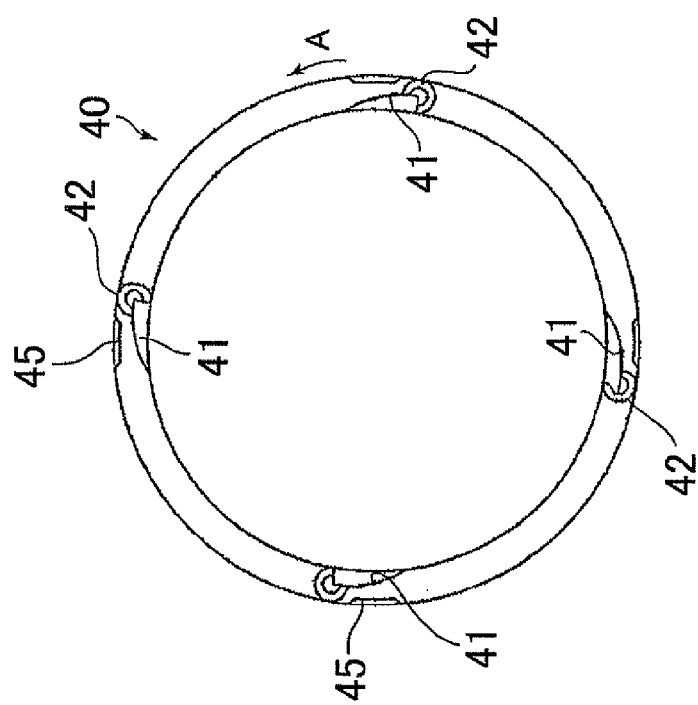
FIG. 2C is a back view of the oil receiver according to the first embodiment of the present invention.
Figure 2B:
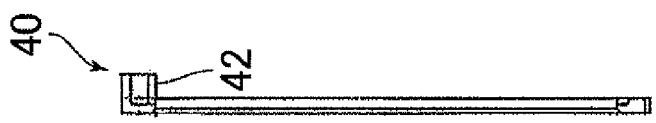
FIG. 2B is a side view of the oil receiver according to the first embodiment of the present invention.
Figure 2A:
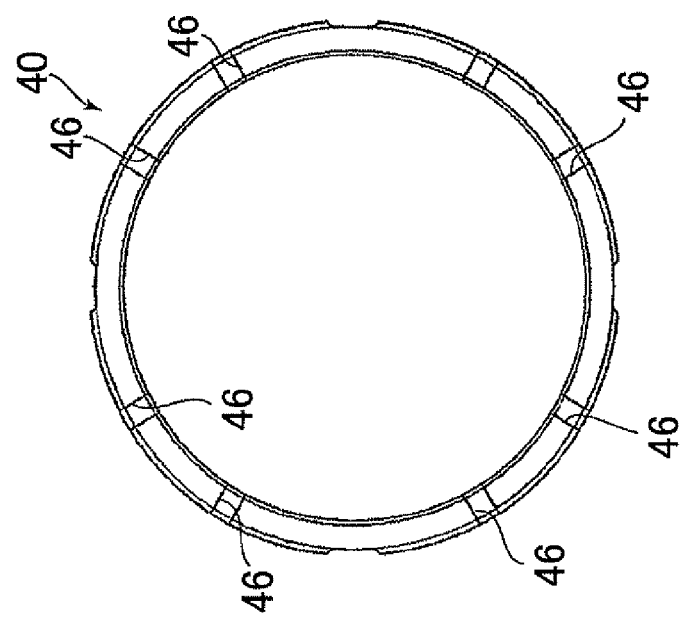
FIG. 2A is a front view of an oil receiver according to the first embodiment of the present invention.

As shown in FIG. 1B, a speed change mechanism 1 is a speed change mechanism of an eight-speed automatic transmission that is preferably used in front engine, rear drive (FR) type vehicles. The speed change mechanism 1 is mounted on a vehicle so that a direction shown by arrow F is the front side of the vehicle, and a direction shown by arrow R is the rear side of the vehicle. This speed change mechanism 1 has a planetary gear DP in which a sun gear 5, pinion gears 6a, 6b, a ring gear 7, and a carrier 9 are radially positioned, in a predetermined relation to each other, about an input shaft 3 of the automatic transmission which can be connected to an engine, not shown. A fourth clutch C-4, which is an input rotation transmission clutch for transmitting input rotation from the input shaft 3 via the carrier 9, is positioned forward of the planetary gear DP, and a third clutch C-3, which is a reduced rotation transmission clutch for transmitting reduced rotation, is positioned on the outer diameter side of the planetary gear DP. The fourth clutch C-4 and the third clutch C-3 are positioned close to each other.

The planetary gear DP is a double-pinion type planetary gear in which the first pinion gears 6a meshing with the sun gear 5, and the second pinion gears 6b each meshing with a corresponding one of the first pinion gears 6a and the ring gear 7, are supported in pairs by the carrier 9. The carrier 9 is formed by a front side plate 9a and a rear side plate 9b, which rotatably support pinion shafts 10, 11 of the first pinion gears 6a and the second pinion gears 6b, and a bridge 9c that connects these annular front and rear side plates 9a, 9b. Note that the first pinion gears 6a and the second pinion gears 6b are helical gears whose meshing teeth $6a_1$, $6b_1$ are formed helically at an angle. The surfaces of these helical gears are herein referred to as tooth surfaces $6a_2$, $6b_2$.

The rear side plate 9b is fixedly mounted on a flange portion 3a of the input shaft 3, which extends radially at a position rearward of the pinion gears 6a, 6b (on the R side in FIG. 1B), and the carrier 9 is structured to rotate with the input shaft 3. A hub portion 9d of the fourth clutch C-4 is formed on the front side plate 9a so as to extend forward (to the F side in FIG. 1B) from the outer periphery of the front side plate 9a.

On the inner diameter side of the carrier 9, the sun gear 5 is fixed to a sleeve member 12 that is fitted on the outer peripheral surface of the input shaft 3 and extends forward. The sleeve member 12 is integrally fixed to the inner peripheral surface of a boss portion 14 that extends rearward from the inner diameter side of the rear surface of a partition wall member of a transmission case, and in a broad sense, is part of the boss portion 14. That is, the sun gear 5 is fixed non-rotatably with respect to the boss portion 14.

The ring gear 7 is supported by spline-fitting inner friction plates 13 of the third clutch C-3 on the outer peripheral surface of the ring gear 7, and spline-fitting a support member 15, which forms a clutch drum of the first clutch, on the rear end of the inner peripheral surface of the ring gear 7.

The structure of the fourth clutch C-4 will be described in detail below. The fourth clutch C-4 has inner friction plates 16, which are spline-fitted on the hub portion 9d that is integrally formed on the front side plate 9a of the carrier 9, outer friction plates 17, which are spline-fitted on a drum portion 20b that extends axially on the inner diameter side of a piston member 19 of the third clutch C-3, and a hydraulic servo 21 that engages and disengages the friction plates 16, 17 with and from each other. The hydraulic servo 21 is positioned adjacent to the front side plate 9a of the carrier 9.

The hydraulic servo 21 has a clutch drum 20, a piston member 22, a cancel plate 23, and a return spring 25, and these elements of the hydraulic servo 21 form an oil chamber 26 and a cancel oil chamber 27. The clutch drum 20 has a flange portion 20a that extends from the inner diameter side to the outer diameter side, and the drum portion 20b that extends rearward from the outer periphery of the flange portion 20a. A base end on the inner diameter side of the flange portion 20a is spline-fitted on a hub portion 24 that is part of a clutch drum of the third clutch C-3.

The piston member 22 is positioned behind the flange portion 20a of the clutch drum 20 so as to be movable longitudinally, and the oil-tight oil chamber 26 is formed between the piston member 22 and the clutch drum 20 by three seal rings 29a, 29b, 29c. A snap ring 28, which is fitted on the hub portion 24, prevents rearward movement of the cancel plate 23. The return spring 25 is provided in a compressed state between the cancel plate 23 and the piston member 22 positioned in front of the cancel plate 23, and the oil-tight cancel oil chamber 27 is formed between the cancel plate 23 and the piston member 22 by two seal rings 29c, 29d.

An oil passage structure (a lubricating structure) of the speed change mechanism 1 will be described below. The input shaft 3 has oil passages a1, a2 that are formed from its rear end toward the front. The oil passage a2 connects to the outer peripheral surface of the input shaft 3 via radial oil passages c1, c2, c3. An oil passage b1 is formed from the front side in the boss portion 14 of the partition wall member. The oil passage b1 connects to oil passages b2, b3, which are formed in the boss portion 14 and the flange portion 20a of the clutch drum 20 and communicate with the oil chamber 26. The oil passage b1 also connects to oil passages b4, b5, which are formed in the boss portion 14 and the hub portion 24 at positions rearward of the oil passage b2 and communicate with the cancel oil chamber 27.

An oil passage d1 for supplying a lubricant (oil) to needle bearings 30, 31 of the pinion shafts 10, 11 and the ring gear 7 is formed in the rear side plate 9b of the carrier 9. The oil passage d1 communicates with oil passages d2, d3 that are formed in the pinion shafts 10, 11 of the first and second pinion gears 6a, 6b.

When the lubricant is supplied to the oil passage in the boss portion 14 based on an oil pressure generated by an oil pump, not shown, the lubricant is supplied to the oil passage a2 in the input shaft 3, and is scattered from the oil passages c1 to c3 to the outer diameter side by centrifugal force resulting from rotation of the input shaft 3. The lubricant supplied through the oil passage c1 is scattered between the front side plate 9a of the carrier 9 and the first pinion gear 6a through an oil hole c4 formed in the sleeve member 12, thereby lubricating the interface between the pinion shaft 10 of the first pinion gear 6a and the needle bearing 30 from the front side.

The lubricant supplied from the oil passage c2 flows between the sun gear 5 and the flange portion 3a of the input shaft 3, and is supplied to the oil passage d1 formed in the rear side plate 9b of the carrier 9. The lubricant thus supplied to the oil passage d1 is supplied to the needle bearings 30, 31 through the oil holes d2, d3 formed in the centers of the pinion shafts 10, 11, and oil passages d4, d5 that respectively open toward outer peripheries of the pinion shafts 10, 11, in the central parts thereof. After lubricating the needle bearings 30, 31, the lubricant flows on the transfer surfaces of the needle bearings 30, 31, and is supplied to the ring gear 7 through a gap 35 between the second pinion gear 6b and the rear side plate 9b of the carrier 9, in each cutout 33 of the carrier 9 which is formed so that the second pinion gear 6b meshes with the ring gear 7. The lubricant thus lubricates the ring gear 7.

When engagement oil pressures of a first clutch, a second clutch, the third clutch C-3, the fourth clutch C-4, a first brake, a second brake, and a lockup clutch are generated by hydraulic control in a hydraulic control device, not shown, based on the oil pressure generated by the oil pump, and a hydraulic fluid (oil) for engaging the fourth clutch C-4 is supplied to the oil passage b1 in the boss portion 14, the hydraulic fluid is supplied to the oil chamber 26 of the fourth clutch C-4 through the oil passages b2, b3. As the hydraulic fluid is supplied to the oil chamber 26, the piston member 22 is pressed rearward, and the fourth clutch C-4 is engaged. The hydraulic fluid supplied to the oil passage b1 is supplied to the cancel oil chamber 27 through the oil passages b4, b5 by centrifugal force resulting from rotation of the clutch drum 20.

An oil receiver 40 will be described below. As shown in FIGS. 1A, 1B, 2A to 2C, the oil receiver 40 is an annular resin member, and collecting portions 41 for collecting oil scattered from the inner diameter side, and guide portions 42 for guiding the oil collected by the collecting portions 41 are formed at four circumferential positions on the back surface of the oil receiver 40, which is located on the rear side in an attached state.

The guide portions 42 are cylindrical protruding portions, each having a cutout at a position located on the inner diameter side and forward in a rotation direction A of the carrier 9. The guide portions 42 are fittingly inserted in through holes 43 formed in the front side plate 9a of the carrier 9, whereby the oil receiver 40 is integrally attached to the carrier 9 (the front side plate 9a) between the carrier 9 and the cancel plate 23 of the fourth clutch C-4.

The collecting portions 41 are grooves that are formed along the inner peripheral edge of the oil receiver 40 so as to have their base ends located at the cutouts of the guide portions 42. The radial width of the collecting portions 41 decreases forward in the rotation direction A of the carrier 9 so that the collecting portions 41 can collect a larger amount of oil. That is, the collecting portions 41 are shaped so as to pick up oil in the rotation direction A of the carrier 9.

Recesses 45 are formed on the outer diameter side of the collecting portions 41, and a plurality of grooves 46 extending from the inner diameter side toward the outer diameter side are formed in the front surface of the oil receiver 40. The recesses 45 and the grooves 46 allow a certain amount of the oil collected by the oil receiver 40 to escape to the outer diameter side, thereby lubricating the friction plates 16, 17 of the fourth clutch C-4.

The through holes 43 for fittingly inserting the guide portions 42 therein are formed at positions located on the inner diameter side of the carrier 9 and forward in the rotation direction of the carrier 9, with respect to the centers X of the second pinion gears 6b. Thus, the oil that is scattered from a base (a hole) 23a of the cancel plate 23 of the fourth clutch C-4 is collected by the collecting portions 41 of the oil receiver 40 on the front side of the vehicle, which is the side opposite to the pinion gears 6a, 6b with respect to the front side plate 9a of the carrier 9. The collected oil is then guided through the front side plate 9a toward the planetary gear DP by the guide portions 42 extending from the front side plate 9a side toward the rear side plate 9b, and the guided oil is scattered from the openings of the guide portions 42, which are formed at positions forward of the second pinion gears 6b in the rotation direction of the carrier 9. The oil thus scattered from the guide portions 42 is scattered toward the tooth surfaces $6b_2$ of the second pinion gears 6b by centrifugal force and inertial force resulting from rotation of the carrier 9, thereby cooling and lubricating the tooth surfaces $6b_2$ of the second pinion gears 6b.

As described above, the oil receiver 40 is integrally attached to the front side plate 9a between the front side plate 9a and the fourth clutch C-4. Thus, the oil receiver 40 can be used as a spacer for maintaining the gap between the cancel plate 23 of the fourth clutch C-4 and the carrier 9. Moreover, oil that has passed through the hydraulic servo 21 of the fourth clutch C-4, that is, relatively cold oil from the cancel oil chamber 27 of the fourth clutch C-4 which has not been heated by gear meshing, can be collected on the side opposite to the planetary gear DP with respect to the front side plate 9a. Furthermore, since the oil receiver 40 collects the oil that has passed through the hydraulic servo 21 of the fourth clutch C-4, the oil receiver 40 can collect a required amount of oil even if the sun gear 5 is fixed.

The oil that has passed through the hydraulic servo 21 of the fourth clutch C-4 is guided toward the planetary gear DP by the guide portions 42, and is scattered at positions near the second pinion gears 6b, which are located on the inner diameter side and forward in the rotation direction of the carrier 9, with respect to the centers (the central axes) X of the pinion shafts 11 of the second pinion gears 6b. Thus, the oil can be scattered toward the tooth surfaces $6b_2$ of the second pinion gears 6b by the centrifugal force and the inertial force resulting from rotation of the carrier 9. Moreover, even if the second pinion gears 6b revolve around the sun gear 5, the oil receiver 40 moves accordingly, whereby the oil can be continuously supplied to the tooth surfaces $6b_2$ of the second pinion gears 6b.

Furthermore, since the oil receiver 40 is made of a resin, the oil receiver 40 can be easily formed by injection molding or the like, and thus processing cost is low. Moreover, since the oil receiver 40 is used also as the spacer, cost reduction can be achieved.

Second Embodiment

A second embodiment, which is implemented by partially changing the first embodiment, will be described with reference to FIGS. 3A, 3B and 4. In the second embodiment, the shape of the guide portions 42 of the oil receiver 40 and the positions to which the guide portions 42 are attached are changed from those of the first embodiment. As shown in FIG. 3A, through holes 43 of a carrier 9 for fittingly inserting guide portions 42 therethrough are provided near first pinion gears 6a at positions located on the inner diameter side and forward in the rotation direction of the carrier 9, with respect to the centers (central axes) Y of pinion shafts 10 of first pinion gears 6a.

Figure 3B:
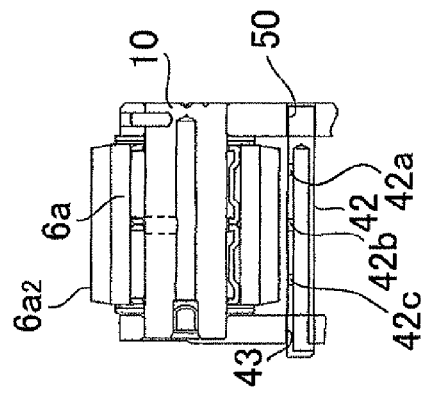
FIG. 3B is an enlarged view of a main part showing a state in which an oil receiver is attached according to the second embodiment of the present invention.
Figure 3A:
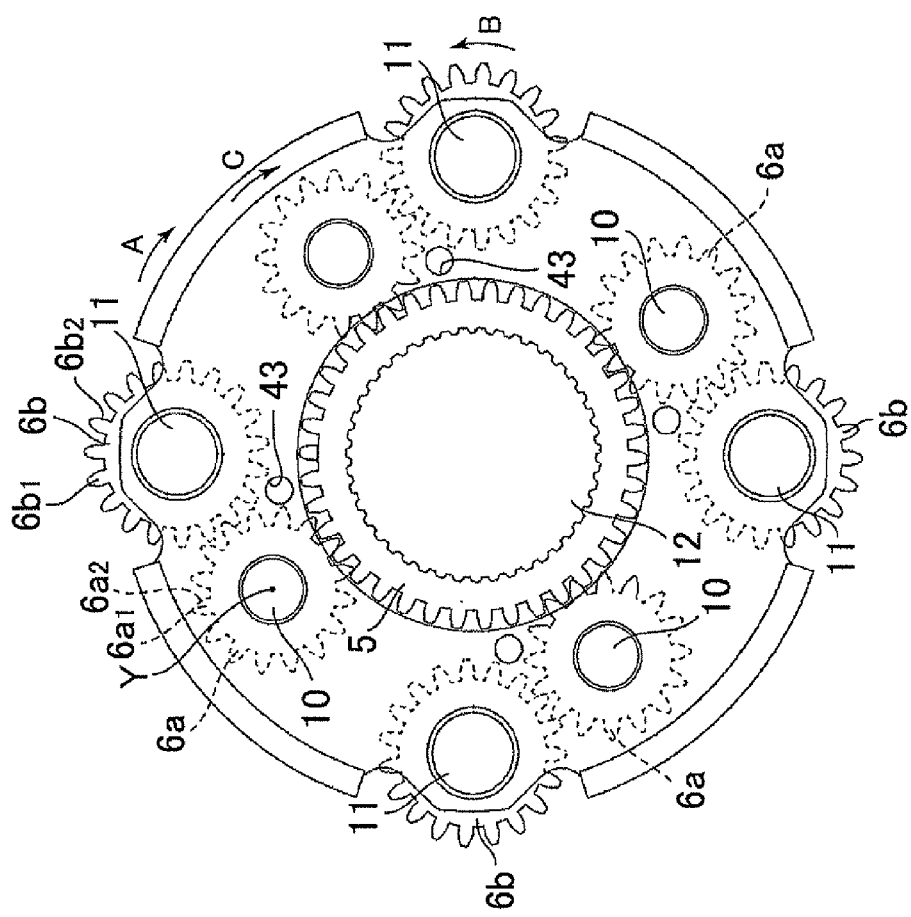
FIG. 3A is a front view of a planetary gear of a speed change mechanism according to a second embodiment of the present invention.
Figure 4:
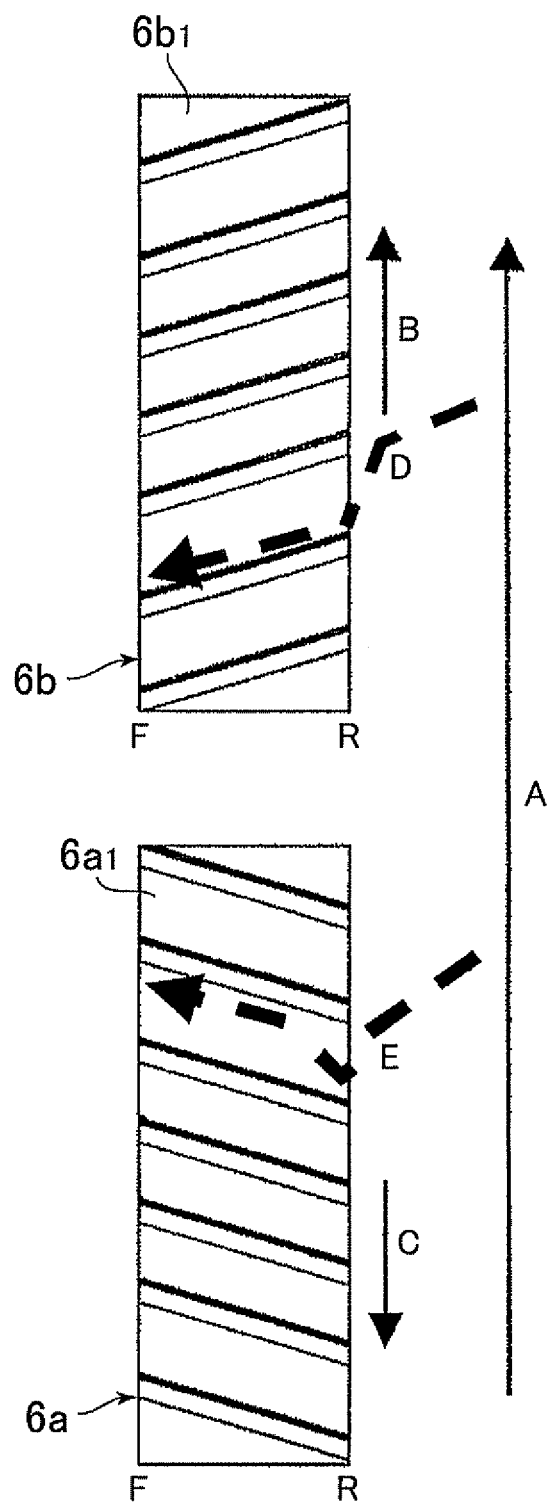
FIG. 4 is a schematic diagram showing an oil flow on the tooth surface of a pinion gear according to the second embodiment of the present invention.

As shown in FIG. 3B, the guide portion 42 extends long rearward and parallel to the tooth surface of the first pinion gear 6a. The guide portion 42 is fittingly inserted through the through hole 43 from a front side plate 9a side, and a top end of the guide portion 42 is fittingly inserted in a hole 50 formed in a rear side plate 9b (that is, a side plate located on the side opposite to the side plate to which the oil receiver is attached), and is thus supported by the hole 50. Moreover, the cylindrical guide portion 42 has openings 42a, 42b, 42c formed at a plurality of positions in its outer periphery (the outer diameter side) in a front region, a central region, and a rear region of the tooth surface of the first pinion gear 6a, so that oil is uniformly scattered to the tooth surface $6a_2$ of the first pinion gear 6a.

An oil flow on pinion gears will be described below. As shown in FIG. 4, the first pinion gear 6a and a second pinion gear 6b are helical gears whose meshing teeth $6a_1$, $6b_1$ are formed helically at an angle. Since input rotation in one direction is input from an input shaft 3 (an engine) to the carrier 9, and a sun gear 5 is held stationary, the first and second pinion gears 6a, 6b are rotationally driven in one direction in terms of both rotation directions B, C and revolution direction A.

Oil supplied from the guide portions 42 to the pinion gears 6a, 6b flows on the tooth surfaces from the rear side plate 9b side (the R side in FIG. 4) of the carrier 9 to the front side plate 9a side (the F side in FIG. 4), based on the rotation directions B, C of the pinion gears 6a, 6b and a twisting direction of the meshing teeth $6a_1$, $6b_1$, whereby flowing directions D, E of the oil are produced.

Each guide portion 42 of the oil receiver 40 has the opening 42a on the rear side plate 9b side, which is the upstream side of the flowing direction (the upstream side of the moving direction) of the oil, so that the tooth surface $6a_2$ of the first pinion gear Ga can be evenly and uniformly lubricated from the upstream side to the downstream side along the flowing direction of the oil.

As this sufficiently lubricated tooth surface of the first pinion gear 6a meshes with the tooth surface of the sun gear 5, the sun gear 5 can also be evenly lubricated and cooled. The tooth surface of the second pinion gear 6b that is located on the outer diameter side with respect to the first pinion gear 6a is also evenly and efficiently lubricated and cooled.

Note that in the first and second embodiments, the rear side plate 9b side of the carrier 9 is the upstream side of the flowing direction of the oil. However, the meshing teeth $6a_1$, $6b_1$ of the first and second pinion gears 6a, 6b may be tilted in the opposite direction so that the front side plate 9a side is the upstream side of the flowing direction of the oil. The present invention is applicable not only to speed change mechanisms of FR type automatic transmissions, but also to speed change mechanisms of FF type automatic transmissions, continuously variable transmissions, and hybrid drive devices. Note that as used herein, the term "speed change mechanism" represents a concept that also includes forward/rearward travel switching mechanisms of the continuously variable transmissions, and power split mechanisms of the hybrid drive devices.

It should also be understood that the present invention can be applied to single-pinion type planetary gears instead of double-pinion type planetary gears, and it is also preferable to apply the present invention to Ravigneaux type planetary gears and Simpson type planetary gears.

The lubricating structure of the speed change mechanism of the present invention is used for speed change mechanisms of automatic transmissions, hybrid drive devices, and the like that are mounted on passenger cars, trucks, and the like, and is particularly preferable when used to lubricate planetary gears of such speed change mechanisms.

What is claimed is:

1. A lubricating structure of a speed change mechanism, the speed change mechanism including a planetary gear set that supports a third pinion gear by a carrier via a pinion shaft, the pinion gear revolving around a sun gear when the third pinion gear is rotating in the speed change mechanism, the lubricating structure of the speed change mechanism comprising:

an oil receiver formed separately from the carrier and attached to the carrier, the oil receiver having a collecting portion configured to collect oil that is scattered from an inner diameter side of the oil receiver, the oil receiver being provided on a side opposite to the third pinion gear with respect to a first side plate of the carrier, and the oil receiver having a guide portion configured to guide the oil collected by the collecting portion, wherein the guide portion extends through the side plate of the carrier, and the guide portion has a first exit opening on a gear set radially inward side of a center of the pinion shaft to supply an oil flow to a tooth surface of the third pinion gear.

2. The lubricating structure of the speed change mechanism according to claim 1, further comprising:

a clutch having a hydraulic servo positioned adjacent to the oil receiver, wherein the collecting portion of the oil receiver collects oil that has passed through the hydraulic servo of the clutch.

3. The lubricating structure of the speed change mechanism according to claim 2, wherein the oil receiver is a spacer that maintains a gap between the hydraulic servo of the clutch and the carrier.

4. The lubricating structure of the speed change mechanism according to claim 1, wherein the guide portion extends parallel to the third pinion gear from the first side plate to a second side plate of the carrier which is located on the other side of the carrier, and the guide portion opening is one of a plurality of openings, the plurality of openings being formed at a plurality of positions along the tooth surface of the third pinion gear.

5. The lubricating structure of the speed change mechanism according to claim 1, wherein the guide portion being configured with an entrance opening through which oil enters the guide portion and at least one second exit opening through which oil exits the guide portion;

the third pinion gear is a helical gear with meshing teeth being formed helically at an angle, and the third pinion gear is rotationally driven so as to rotate in one direction, and the second exit opening is oriented on an upstream side of a moving direction of the oil flow along the helical meshing teeth of the third pinion gear, and the moving direction of the oil flow is based on the rotation in the one direction.

6. The lubricating structure of the speed change mechanism according to claim 1, wherein the planetary gear set is a double-pinion type planetary gear set including the carrier, and the planetary gear set further includes: (1) a first pinion gear that meshes with the sun gear, and (2) a second pinion gear that meshes with a ring gear, and the guide portion is provided near the first pinion gear at a position forward of the first pinion gear in a rotation direction of the carrier.

7. The lubricating structure of the speed change mechanism according to claim 1, wherein the sun gear is used in a fixed state.

* * * * *